United States Patent [19]

Baratz et al.

[11] Patent Number: 5,109,483

[45] Date of Patent: Apr. 28, 1992

[54] NODE INITIATING XID EXCHANGES OVER AN ACTIVATED LINK INCLUDING AN EXCHANGE OF SETS OF BINDING SIGNALS BETWEEN NODES FOR ESTABLISHING SESSIONS

[75] Inventors: Alan E. Baratz, Chappaqua, N.Y.; John E. Drake, Jr., Pittsboro, N.C.; George A. Grover, Mahopac, N.Y.; James P. Gray, Chapel Hill, N.C.; Melinda R. Pollard, Raleigh, N.C.; Diane P. Pozefsky, Chapel Hill, N.C.; Lee M. Rafalow, Durham, N.C.

[73] Assignee: International Business Machines Corp., Armonk, N.Y.

[21] Appl. No.: 62,280

[22] Filed: Jun. 15, 1987

[51] Int. Cl.$^5$ .................. G06F 13/00; G06F 15/16
[52] U.S. Cl. .................. 395/200; 364/228; 364/229; 364/232.7; 364/242.96; 364/260; 364/284.4; 364/931.45; 364/940.64
[58] Field of Search ... 364/200 MS File, 900 MS File

[56] References Cited

U.S. PATENT DOCUMENTS

| | | | |
|---|---|---|---|
| 4,335,426 | 6/1982 | Maxwell et al. | 364/200 |
| 4,532,588 | 5/1985 | Foster | 364/200 |
| 4,586,134 | 4/1986 | Norstedt | 364/200 |
| 4,648,061 | 3/1987 | Foster | 364/900 |
| 4,677,588 | 6/1987 | Benjamin et al. | 364/200 |
| 4,720,784 | 1/1988 | Radhakrishnan et al. | 364/200 |
| 4,791,566 | 12/1988 | Sudama et al. | 364/200 |

OTHER PUBLICATIONS

Meijer et al., Computer Network Architectures, 1982, pp. 109–110 and 125–131.

Primary Examiner—Thomas C. Lee
Assistant Examiner—Ayni Mohamed
Attorney, Agent, or Firm—Gerald R. Woods

[57] ABSTRACT

Enhanced type 2.1 nodes for SNA networks provide network routing of information between non-adjacent network nodes and program-to-program linkage across the network. These nodes are called "advanced peer to peer networking" (abbreviated APPN) nodes. Network state information, describing the topology and resources of the network is disseminated betweeen APPN nodes by a first data link control exchange of identification (XID) information indicating node type (and thereby distinguishing APPN nodes from other nodes) and other exchanges conducted over a newly defined control point to control point (abbreviated CP—CP) session having a message architecture unique to APPN type nodes. The XID exchange is conducted whenever a link between nodes is activated, and when the exchanging nodes are both APPN, and if both are available to participate in as CP—CP session, they automatically engage in a second exchange of session binding signals which establish a pair of sessions between the nodes. By internal conventions, the node components which use the session pair for exchanging their network state information adapt the sessions to be used in simplex modes with one session flowing from one node to the other and the other flowing in reverse from the other node to the one node. Within these sessions, for the sake of efficiency, communications are not directly acknowledged. Instead, a process transparent to the sessions monitors for link failure and upon such occurrence notifies all affected components to terminate their use of the session and deactivate the session.

5 Claims, 12 Drawing Sheets

| NODE TYPE | ARCHITECTURAL DESCRIPTION | PRIMARY FUNCTIONS |
|---|---|---|
| 5 | • SUBAREA NODE<br>• CONTAINS AN SSCP<br>• CONTAINS A PU TYPE 5<br>• SUPPORTS ALL LU TYPES | • CONTROL NETWORK RESOURCES<br>• SUPPORT APPLICATION AND TRANSACTION PROGRAMS<br>• PROVIDE NETWORK OPERATORS ACCESS TO THE NETWORK<br>• SUPPORT END-USER SERVICES. |
| 4 | • SUBAREA NODE<br>• CONTAINS A PU TYPE 4 | • ROUTE AND CONTROL THE FLOW OF DATA THROUGH THE NETWORK. |
| 2.1 | • PERIPHERAL NODE<br>• CONTAINS ITS OWN CONTROL POINT, WHICH PROVIDES PU SERVICE<br>• SUPPORTS LU TYPE 1,2,3 AND 6.2<br>• SUPPORTS DIRECT LINK CONNECTIONS TO OTHER TYPE 2.1 NODES. | • PROVIDE END USERS ACCESS TO THE NETWORK<br>• PROVIDE END-USER SERVICES. |
| 2.0 | • PERIPHERAL NODE<br>• CONTAINS A PU TYPE 2.0<br>• SUPPORTS LU TYPES 2,3, AND 6.2<br>• SUPPORTS LU TYPE 1 FOR NON-SNA INTERCONNECT. | • PROVIDE END USERS ACCESS TO THE NETWORK<br>• PROVIDE END-USER SERVICES. |

FIG. 3

FIG. 4
EN-END NODE
NN-NETWORK NODE

FIG. 5

| NOTE TYPE | ARCHITECTURAL DESCRIPTION | PRIMARY FUNCTION |
|---|---|---|
| APPN -EN | • SITUATED AT LOGICAL END OF NETWORK<br>• SUPPORTS EXISTING TYPE 2.1 ARCHITECTURE<br>• CAPABILITY EXCHANGE<br>• SUPPORTS A SINGLE CP-CP SESSION | • PROVIDE END USERS ACCESS TO THE NETWORK<br>• PROVIDE END-USERS SERVICES<br>• CAN TRANSFER NETWORK STATE INFO |
| APPN -NN | • SUPPORT EXISTING TYPE 2.1 ARCHITECTURE<br>• CAPABILITY EXCHANGE<br>• SUPPORTS MULTIPLE CP-CP SESSIONS | • PROVIDE END USERS ACCESS<br>• PROVIDE END-USERS SERVICES<br>• INTERMEDIATE NETWORK ROUTING<br>• ROUTE SELECTION<br>• TOPOLOGY MAINTENANCE<br>• DIRECTORY SERVICES<br>• CAN TRANSFER NETWORK STATE INFO |

FIG. 6

FIG. 7 XID3 FORMAT

EN SENDS TO NN

- CAPABILITIES
  - ABILITY TO RECEIVE DIRECTORY QUERIES
  - ABILITY TO RECEIVE NETWORK MANAGEMENT QUERIES
  - ABILITY TO RECEIVE DIRECTORY QUERIES FOR UNKNOWN RESOURCES
  - TYPES OF RESOURCES FOR WHICH IT CAN RECEIVE DIRECTORY QUERIES

- REQUESTS FOR DIRECTORY SEARCHES AND SESSION SERVICES
- REPLIES TO DIRECTORY QUERIES
- INDICATIONS OF ERRORS OR FAILURES OF RESOURCES
- REPLIES TO NETWORK MANAGEMENT QUERIES

NN SENDS TO EN

- CAPABILITIES
  - ABILITY TO RECEIVE REQUESTS FOR DIRECTORY SEARCHES
  - ABILITY TO ACCEPT REGISTRATION OF RESOURCES
  - ABILITY TO ACCEPT REGISTRATION OF RESOURCE CHARACTERISTICS

- REPLIES TO EN's REQUESTS FOR DIRECTORY SEARCHES AND SESSION SERVICES
- DIRECTORY QUERIES
- NETWORK MANAGEMENT QUERIES

QUERY = CHECK MY LOCAL RESOURCES
SEARCH = CHECK ALL RESOURCES IN THE NETWORK

FIG. 11
COMMUNICATION BETWEEN NNs

- CAPABILITIES
    - ABILITY TO SUPPORT DIRECTORY SEARCHES
    - ABILITY TO SUPPORT TOPOLOGY EXCHANGES

- TOPOLOGY EXCHANGES
    - COMPLETE TOPOLOGY OF THE NETWORK AS KNOWN TO SENDING NODE WHEN THE SESSION IS ESTABLISHED
    - CHANGES TO LOCAL TOPOLOGY OR STATUS OR CHARACTERISTICS OF RESOURCES OWNED BY THE SENDING NODE
    - CHANGES RECEIVED FROM OTHER NODES

- DIRECTORY SEARCHES FOR ANY RESOURCES IN THE NETWORK, TWO FORMS ARE TRANSMITTED
    - SEARCHES DIRECTED TO A SPECIFIC NN
    - SEARCHES BROADCAST TO ALL NN's

FIG. 12
EXAMPLES OF TECHNIQUES USED FOR RECOGNIZING LINK FAILURES

- TIMER EXPIRATION:
    - NO MESSAGE (e.g., POLL OR ACKNOWLEDGEMENT) RECEIVED IN A GIVEN TIME

- RETRY LIMIT EXCEEDED:
    - INABILITY TO SUCCESSFULLY TRANSMIT A MESSAGE AND RECEIVE POSITIVE ACKNOWLEDGEMENT AFTER SOME NUMBER OF RETRIES

- LINE DROPPED INDICATION FROM A MODEM

- UNEXPECTED RE-INITIATION OF LINK

NODE INITIATING XID EXCHANGES OVER AN ACTIVATED LINK INCLUDING AN EXCHANGE OF SETS OF BINDING SIGNALS BETWEEN NODES FOR ESTABLISHING SESSIONS

1. CROSS-REFERENCE TO RELATED APPLICATIONS

Co-pending patent application Ser. No. 062,272, now issued U.S. Pat. No. 4,827,411 issued Apr. 25, 1989, by A. H. Arrowood et al, filed Jun. 15, 1987, and entitled "Method Of Maintaining a Topology Database" discloses a method of maintaining a common database of link and node topology information at plural nodes of a computer network. Said method uses techniques disclosed in the present application.

Co-pending patent application Ser. No. 062,269 now U.S. Pat. No. 4,914,571 by A. E. Baratz et al, filed Jun. 15, 1987 and entitled "Locating Resources In Computer Networks", discloses a technique for locating devices and other resources (programs, databases, etc.) in computer networks which uses communication techniques disclosed herein.

2. BACKGROUND OF THE INVENTION

The present invention relates to computer networks and particularly to a method for facilitating the flow of network state information, as defined hereafter, between certain newly defined types of network nodes having newly defined capabilities.

TERMS AND CONCEPTS

The following discussion of terms and concepts may be helpful for understanding the problems solved by the present invention. Concepts and terms presently considered to be new are so indicated below. Others are described in greater detail in one or more of these published references: (1) Systems Network Architecture, Concepts And Products, I.B.M. Publication GC30-3072-3, Copyright International Business Machines Corporation, Oct. 1986; (2) Systems Network Architecture, Technical Overview, I.B.M. Publication GC30-3073-2, Copyright International Business Machines Corporation, Sep. 1986; (3) Systems Network Architecture, Transaction Programmer's Reference Manual For LU Type 6.2, I.B.M. Publication GC30-3084-2, Copyright International Business Machines Corporation Nov. 1985; (4) SNA Format And Protocol Reference Manual: Architecture Logic For Type 2.1 Nodes, I.B.M. Publication SC30-3422-0, Copyright International Business Machines Corporation, Dec. 1986; (5) Systems Network Architecture Reference Summary, I.B.M. Publication GA27-3136-6, Copyright International Business Machines Corporation, May 1985; (6) Synchronous Data Link Control Concepts, I.B.M. Publication GA27-3093-3, Copyright International Business Machines Corporation, Jun. 1986; (7) Systems Network Architecture Format and Protocol Reference Manual: Architecture Logic for LU Type 6.2, I.B.M. Publication SC30-326903, Copyright International Business Machines Corporation, Dec. 1985. While these references contain a great deal of useful information, they are not essential to an understanding of the present invention.

In general, networks comprise communication links formed within physical media or electromagnetic wave channels, and equipment coupled to such links at "nodes" or points of connection. Computer networks are characterized by the presence of computers at some of the nodes, as distinguished from networks having only so-called "dumb terminals" at all nodes.

Nodes controlling communications in a network require certain information in respect to physical and logical characteristics and states of links and nodes ("topology" information), network error conditions, and resources available at the nodes ("resources information). The term "network state" information is used presently to characterize information falling into any of these categories. Techniques by which some of such information is maintained or located are disclosed in the above cross-referenced patent applications.

SNA networks presently classify nodes in four type categories—2.0, 2.1, 4, and 5—according to logical and/or physical characteristics of equipment contained at the nodes. For present purposes, a new species of type 2.1 node (termed type APPN) is defined, and within that species two new sub-species of nodes types NN and EN are defined. Type APPN nodes are nodes capable of certain advanced peer-to-peer networking (hence the acronym "APPN") types of communication operations to be described. Such operations involve transfers of node capability information and other network state information in certain new data link and session communication forms described later. Type EN nodes (also termed "end nodes") are situated at logical end boundaries of the network in that they do not act to communicate information between other nodes and they do not provide services to other nodes. Type NN nodes (also termed "network nodes") are nodes which may carry communications between other nodes and may provide services to other nodes. End nodes generally contain end-use devices such as printers, displays, etc., or computers such as data hosts which only support devices not accessible as network components. Network nodes contain computers which in addition to processing data are adapted for providing communication services for accessing resources at other nodes.

In such networks, information is communicated in various formats. Two forms presently of interest are data link control type communications and sessions. In relation to sessions, data link control communications are generally more direct (only between directly linked nodes), shorter and less extensive in the amount and type of information which can be transferred. A "control point" (CP) is a node component which can activate sessions with other nodes and provides control services and information needed by other components of the respective node and/or control points at other nodes. An APPN node has one and only one control point.

Of particular interest present, are XID (exchange identification) type data link control exchanges and sessions between network control points. XID exchanges are used for determining characteristics of adjacent nodes. During activation, APPN nodes use XID exchanges to selectively instigate certain newly defined actions relative to other APPN nodes. Such actions include session binding signal exchanges to establish a pair of oppositely directed simplex sessions relative to each node returning XID indication of both capability and availability for such sessions, and capability message exchanges via said sessions indicating to each node capabilities of the other node. Together, these simplex sessions presently are termed a type APPN CP-CP session (or simply a CP-CP session), and they are used to permit transaction programs at the nodes to exchange additional network state information as needed and as the session becomes available to them (each session is available to only one pair of programs at a time).

Logical units (LUs) manage the flow of information between end users and the network. End users communicate with each other only indirectly via associated LUs. SNA architecture defines LU types including types 1, 2, 3, 4, 6.1 and 6.2 having specific communication responsibilities; types 1, 4, 6.1 and 6.2 supporting communications between programs. Associated with each LU type is a corresponding type of communication protocol (e.g. LU6.2 protocols associated with LU 6.2).

Transaction programs (TPs) are programs that use LU6.2 facilities to communicate with appropriate partners (other TPs) at other nodes. A TP has access to all the facilities available to any program running the same node, plus it has the ability to communicate/"converse" with remote TP partners. TPs intended to communicate or converse as partners must be written in a coordinated manner so that useful communication can be had.

DESCRIPTION OF THE RELATED ART

Computer networks for processing and transmitting data are of course well known. In a typical such network, one or more computers running under control of respective operating systems, and application/transaction software, may interact through communications controllers and communications media to exchange data and to control operations of end use devices such as printers, displays, etc. Furthermore, computer networks susceptible of distributed control at plural active nodes are also well known.

Such networks usually are controlled in accordance with an architecture or set of basic protocols which ensures orderly flow of information between the nodes as well as between resources supported at the nodes. Examples of such architectures are given in: (1) "Computer Network Architecture," by S. Wecker in Computer, Sep. 1979, and (2) "An Introduction To Network Architectures And Protocols," by P. E. Green in the I.B.M. Systems Journal, Vol. 18 No. 2, 1979. These articles describe various architectures, such as SNA, DNA, etc., in terms of a layered structure where components controlling actions for physically controlling communication media are in the lowest layer, components directing actions for interfacing to end users are in the highest layer, and other actions are controlled at intermediate layers. In SNA, 7 such layers are defined: physical, data link control, path control, transmission control, data flow control, presentation services and transaction services. An architecture proposed by the International Organization For Standardization (ISO) comprises a 7-layered structure with levels having different but somewhat overlapping functions in relation to the SNA hierarchy. The ISO model is described by H. Zimmerman in "OSI Reference Model—The ISO Model Of Architecture For Open Systems Interconnection," IEEE Transactions On Communications, Apr. 1980; and features the layers: physical, data link, network, transport, sessions, presentation and application.

The present invention concerns an improved technique for disseminating network state information in SNA networks, with potential for extension to networks based on other architectures including the above OSI model.

In existing SNA networks, newly activated nodes must know before their activation at least the types of nodes to which they will be connected. This "advance" preparation is not only costly but restrictive in that it limits or complicates the installation of technologically new devices on the network.

In existing networks, network state information other than attached links and neighbor node type, is acquired by means of various types of session communications with varied form and context contingent on the type of node and other factors. Thus, programming of such sessions is generally time consuming and involves less re-use of existing code than would be the case if the state information communications could be standardized into a single type of session communication.

Furthermore, such state communications must not be subject to undetectable error and yet must also not impose too large a burden on the network in terms of bandwidth usage, etc. To some extent these requirements conflict. The present invention satisfies both requirements.

SUMMARY OF THE INVENTION

In accordance with the present invention, newly defined APPN type nodes can encompass a variety of existing and yet to be created devices, and require minimal network state information prior to activation. Activation of any node causes links attached to that node to become active, in turn triggering the node to initiate over each link XID exchanges which inform the initiating node of the type of node attached at the other end of the link and inform the node at that end of the initiating node type. In such exchanges APPN nodes indicate their capability for sustaining CP—CP sessions as well as their availability for conducting such sessions (EN nodes can have a CP—CP session active to only one partner at a time, and therefore would indicate unavailability if they have an active session when an XID exchange occurs).

When nodes on both sides of a newly activated link are APPN nodes, information provided by the XID exchange triggers an exchange of session binding signals causing a pair of half-duplex sessions to be established between the nodes. Initial exchanges of capability information on these sessions provide each node with information characterizing certain capabilities of the other node. Information characterizing the service capabilities of the nodes (EN or NN) is provided in the XID exchange. This is necessary to prevent ENs from establishing CP—CP sessions between themselves.

After the capability exchanges are completed, internal operations within the node result in designation of the pair of simplex sessions as a CP—CP session with oppositely directable flows (one send only and the other receive only). Thereafter the CP—CP session is made available to TPs (transaction programs) as needed for enabling them to exchange additional state information as needed. In such transfers, a TP having network state information to send directs the LU which implements the transfer to mark the related outgoing message so that it is transferred in effect on the send only half of the CP—CP session.

Thus, via one serially re-used CP—CP session, many TPs at anode may acquire and disseminate many different kinds of network state information according to individual program needs, and this makes for more efficient use of network links and resources. Furthermore, in present APPN type nodes the LU interfacing between the TPs and the network operate according to LU 6.2 SNA communication protocols, and this includes TPs written specifically for using network state information to be gathered or disseminated via a CP—CP session as well as user-written TPs exchanging other information, resulting in even more efficient reuse of the LU.

A feature of the invention is that the network state communication in each direction of CP—CP communication (recall that each pair of communicating APPN nodes is linked in a pair of oppositely directed sessions) do not require explicit acknowledgements, due to outage detection and session deactivation processes which operate independently of the session communication processes.

These and other features, advantages, benefits and objectives of the present invention will be more fully understood and appreciated by considering the following detailed description and claims.

DESCRIPTION OF PREFERRED EMBODIMENTS

Introduction

The present invention seeks to improve existing network architectures, in particular SNA, for facilitating attachment of new hardware and software components to existing networks. In general, existing SNA networks as typified in FIG. 1, contain a variety of hardware and software components (see FIG. 2) requiring different protocols for communicating and different processes for initializing their entry into the network and enabling them to communicate with currently active elements. This complicates and increases the cost of attaching new types of components (hardware and software) to existing networks, since such attachments usually require modifications of existing protocols for enabling the existing components to recognize the new type additions and may require other modifications if the new type additions have communication capabilities not compatible with the existing architecture.

When introducing new components into existing networks, it is also desirable to minimize the cost of informing such components of network structures and capabilities, as well as the cost of informing existing components of the new component characteristics.

It is also desirable to be able to use existing components to as large an extent as possible for performing the architecture protocols required for interfacing between new programs and the network, thereby minimizing the cost of assembling programs for interfacing between new programs and the network.

The present invention is a response to the recognition of these needs and provides a basis for sustaining long-term adaptability of existing networks to technological advances.

Figure 1:
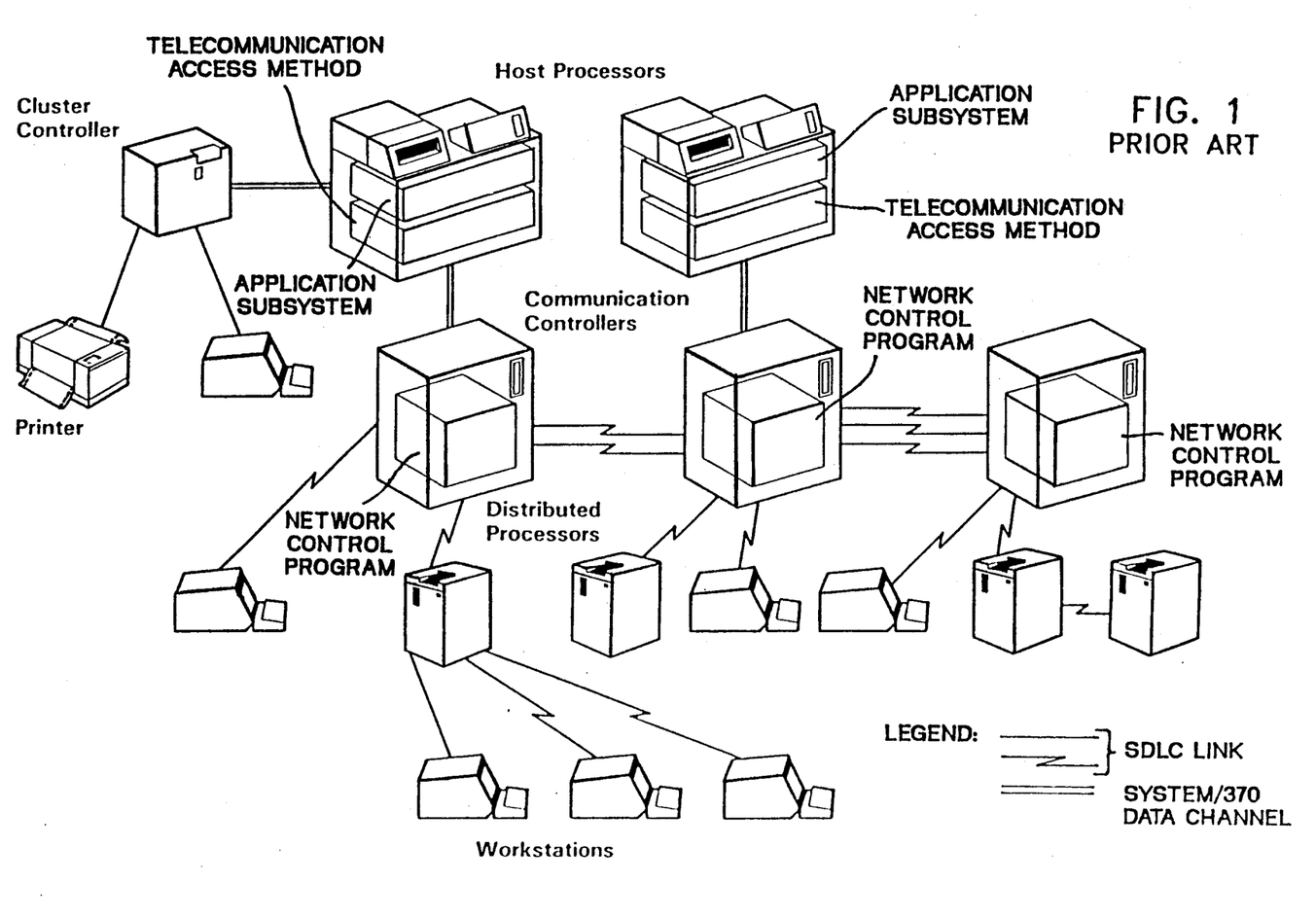
FIG. 1 illustrates a typical "prior art" configuration of hardware and software components in an SNA network constructed according to prior SNA architecture.
Figure 2:
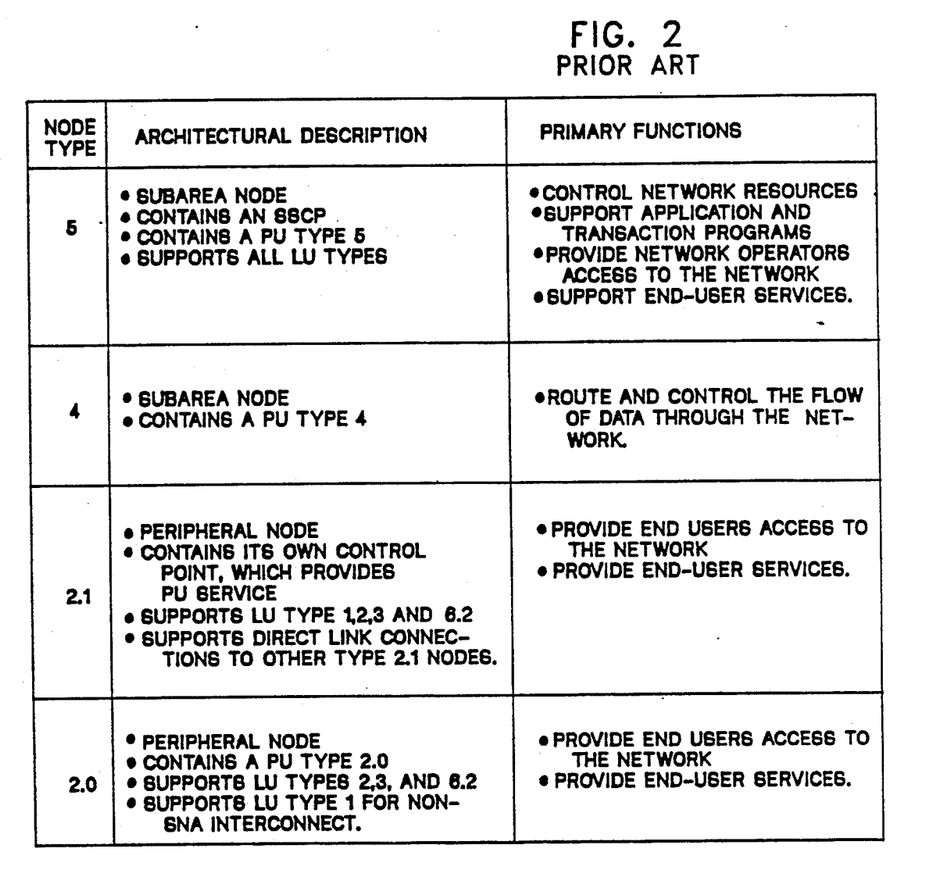
FIG. 2 is a table of prior art node types according to prior SNA architecture, indicating architectural and functional characteristics of each node type.

FIG. 1 illustrates the variety of hardware and software components in a typical existing SNA network. Each node in such a network is a portion of a hardware component which along with associated software components implements the functions of the 7 architecture layers previously mentioned. FIG. 2 indicates type categories of nodes appearing in such networks, their architectural descriptions and their associated primary functions.

These figures indicate that prior to the present invention, SNA networks have generally contained two distinct classes of nodes, subarea and peripheral, each containing two species of node types: types 4 and 5 (hereafter T4 and T5) subarea nodes and types 2.0 and 2.1 (hereafter T2.0 and T2.1) peripheral nodes. Each subarea node is associated with a subarea comprising the node and peripheral nodes attached to it. Subarea nodes are characterized by the type of physical units (PUs) that manage the links that connect them to adjacent nodes. T5 nodes are differential further in that they contain a system services control point (SSCP) component for managing network resources in accordance with commands from network operators relative to an associated portion of the network termed a "domain", and for coordinating session activations between LUs within that domain and through other SSCPs across domains. Peripheral nodes have been associated with sub-areas, as noted above, and have been characterized by more direct associations with end-users as well as support for particular types of LUs. However, T2.1 components are not required to function in subareas (i.e. they can exist and operate independent of subarea nodes), support direct link connections to other T2.1 nodes and support program-to-program communication (via support of LU 6.2 protocols).

Figure 3:
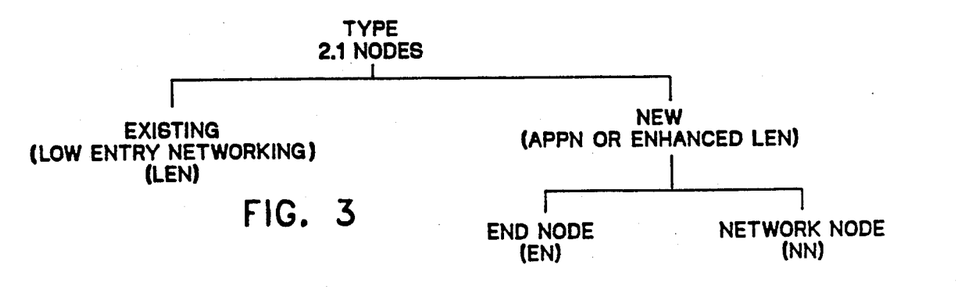
FIG. 3 diagrams the relation between presently defined node types APPn and sub-types NN and EN, and their relation to earlier node types 2.1 as species of a common genus.

Referring to FIG. 3, the invention uses a new species of T2.1 node, called APPN (for "advanced peer to peer networking"), having two sub-species EN (for "end node") and NN (for "network node"). These nodes support routing of communications across the network and satisfy needs indicated above.

APPN Node Network Configurations and Functions

Figure 4:
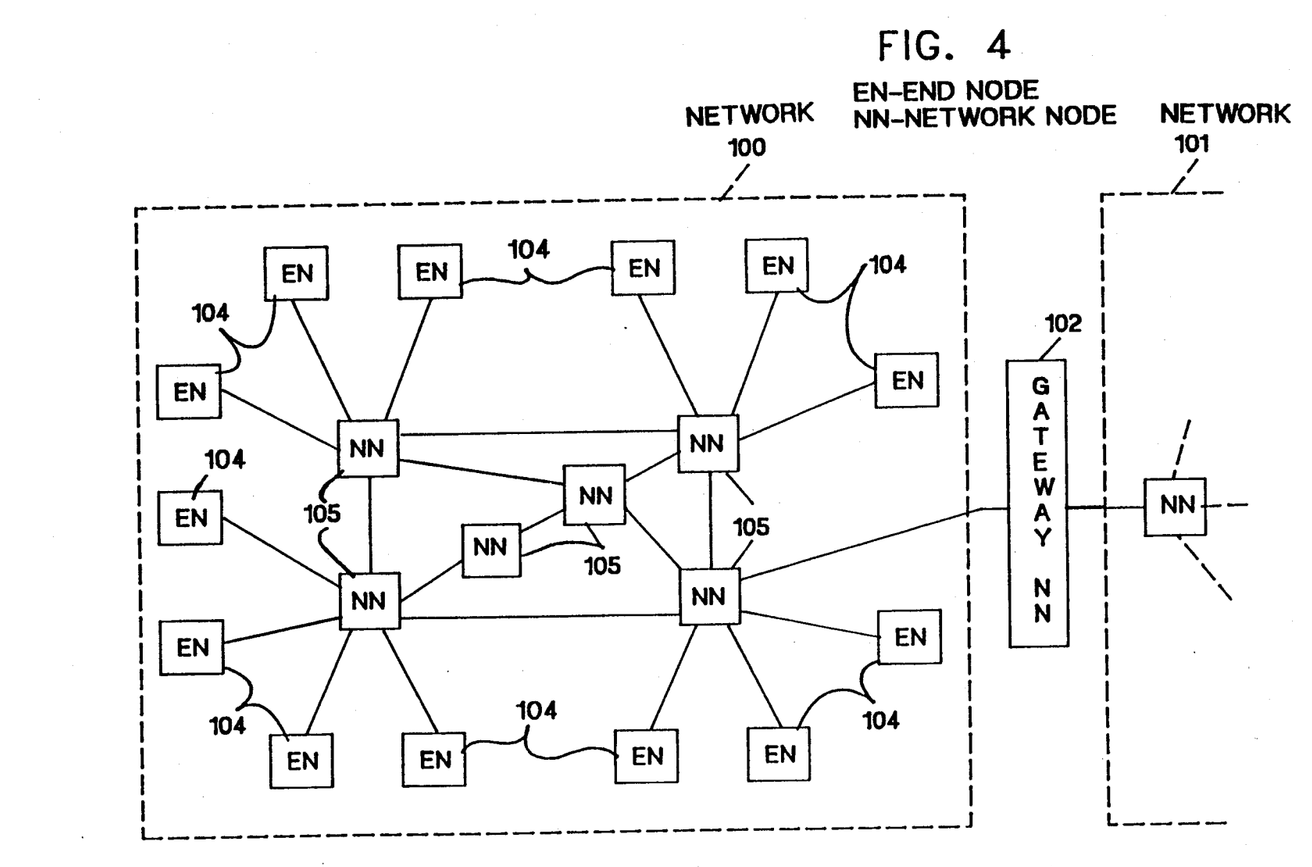
FIG. 4 indicates network topological relationships between type NN and type EN nodes.

FIG. 4 indicates how APPN nodes may be topologically configured in networks, and functions of such nodes.

Referring to FIG. 4, networks 100 and 101, linked by gateway 102, each contain multiple APPN type nodes, and may contain other previously existing type nodes (not shown, and not presently of interest). End nodes (ENs), indicated at 104, are situated at logical ends of the network in the sense that they link only to network nodes (NNs) shown at 105 for CP—CP communications (they may link to other type nodes for other forms of pre-existing SNA communication not presently relevant), and they do not provide cross-linkage between other nodes (i.e. they do not carry communications between nodes). NNs on the other hand link either to ENs or other NNs for CP—CP communication, and do route information across the network.

Figure 5:
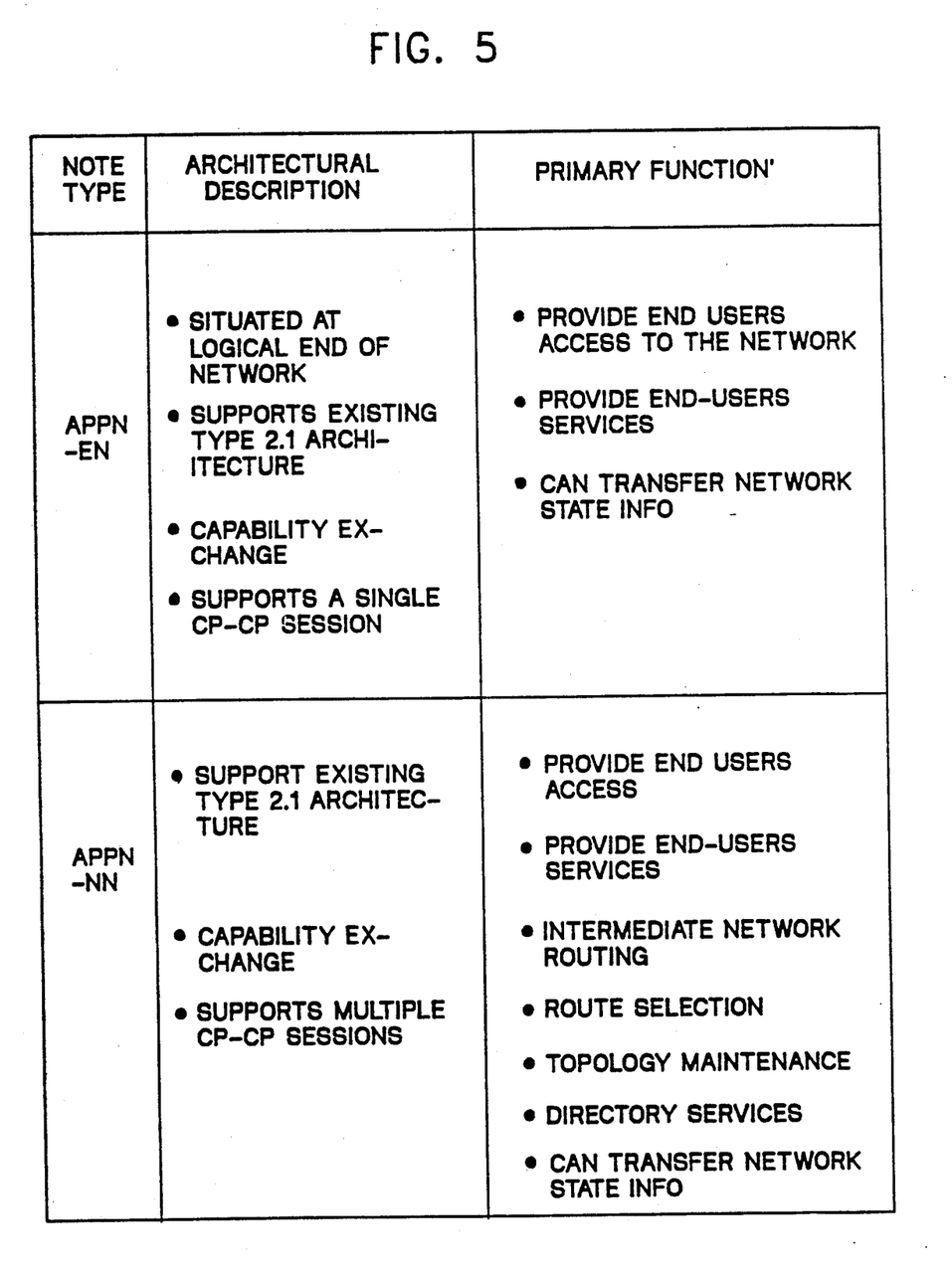
FIG. 5 indicates architectural and functional characteristics of type APPN nodes.

Referring to FIG. 5, all APPN nodes support pre-existing T2.1 functions and architecture, and protocols for establishing and using CP—CP sessions. They also support program to program to program communication via LU 6.2 protocols (discussed in more detail below), and have other functional capabilities in common. They differ in that ENs are at logical ends of the network whereas NNs are at logically intermediate positions, ENs can only support a CP—CP session to one partner while NNs can support CP—CP sessions to more than one partner simultaneously, and NNs can provide services spanning nodes (network routing, route selection, topology maintenance and directory services) which ENs can not.

As just note, these nodes use LU 6.2 protocols to sustain program to program communication. This per se is not new. LUs performing LU 6.2 protocols have been used previously at T5 and T2.1 nodes to perform the various architecture layer functions required to interface between TPs and the network. What is new presently, but not expressed in FIG. 5, is that CP—CP sessions are used by special service TPs written specifically for CP—CP usage and by enabling such TPs to be used with the same LU with minor adaptations, additional efficiencies and economies are realized. Also, having many TPs exchange network state information on a single CP—CP session allows for more efficient use of the network.

Because of the general nature of LU6.2, the service TPS are relieved of concerns that usually burden CP sessions: the TPs are able to send data without concern for buffer sizes at the adjacent node or on the link. This is a service provided by LU6.2.

APPN Node Operations For Establishing A CP—CP Session

Figure 6:
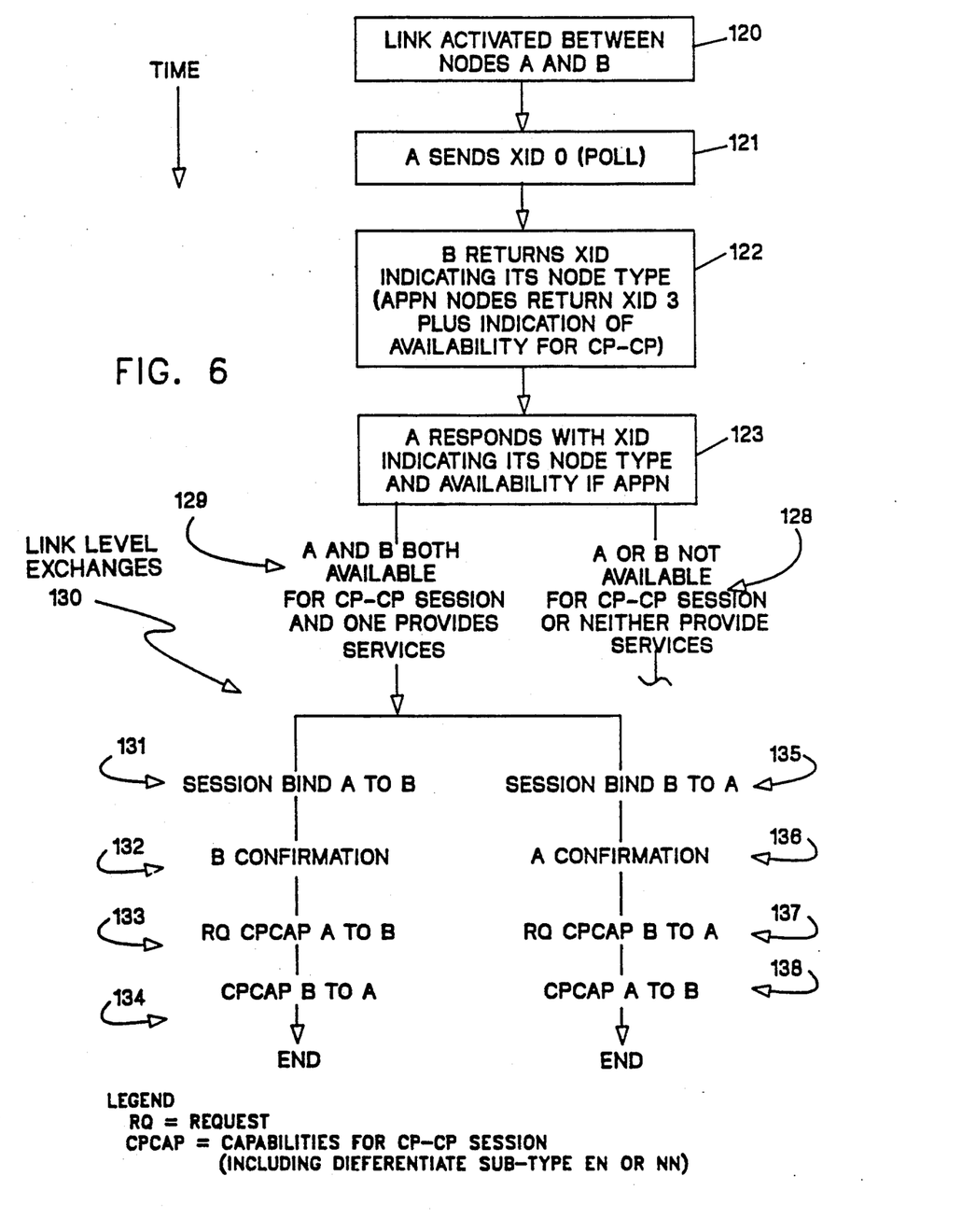
FIG. 6 indicates the sequence of operations between nodes on link activation, with emphasis on operations conducted between APPN type nodes.

FIG. 6 indicates the progression of actions which cause CP—CP session activation/establishment. When a link is activated (placed in service), as suggested at 120, nodes (arbitrarily identified as A and B) attached to the link receive associated signals (e.g. from an operator placing the link in service), and one or both nodes begin an XID data link control exchange. As suggested at 121, it is arbitrarily assumed node A begins. A node receiving an XID poll, node B in this instance, responds with an XID signal indicating its identity, as suggested at 122. For T2.1 nodes the response is an XID 3 signal (discussed in more detail below) unique to these nodes containing information indicating if the responding node supports CP—CP sessions and if so whether services are provided and the node's availability for a CP—CP session. ENs having an active CP—CP session will always be unavailable (see FIG. 5). A node that requires network services (i.e., an EN) only sends a BIND to nodes that provide network services (i.e., an NN). A BIND or Bind Request is issued in setting up a session between two nodes in an SNA network. Two ENs will not establish a CP—CP session. The node sending the XID poll, node A in the illustration, also sends an XID signal indicating if it supports CP—CP and if it does its availability for a session, as shown at 123.

Figure 7:
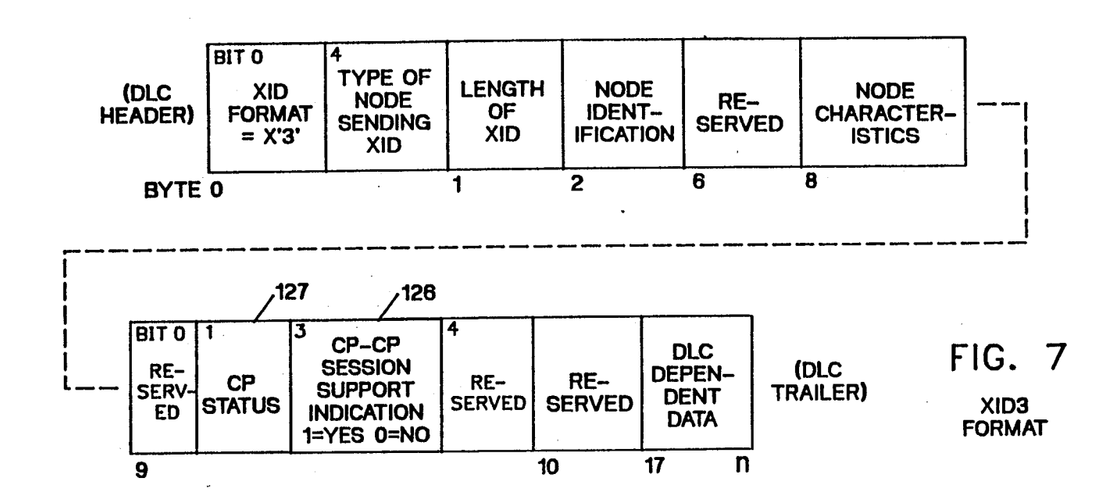
FIG. 7 indicates details of XID 3 message format.

The form of the XID 3 signal is indicated in FIG. 7. As noted above, the XID 3 signal is generic to T2.1 nodes both old and new. Portions of present interest are bit 126 and two-bit field 127. Bit 126 indicates support or non-support of CP—CP sessions. Bits 127, evaluated only if bit 128 indicates CP—CP session support, are interpreted as follows:

B'00' Sender is currently receiving all required network services and a CP—CP session BIND is not requested B'01' Sender is not currently receiving all required network services and a CP—CP session BIND is requested B'10' Sender provides network services via CP—CP sessions but a session BIND is not requested B'11' Sender provides network services via CP—CP sessions and a session BIND is requested.

The value of these bits remains the same in every XID3 signal that a node sends to a particular adjacent node at any time, no matter which link it is sent on. If an XID exchange indicates that a CP—CP session should be established and one already exists, no further action is taken.

Polling step 121 (FIG. 6) is not used by all SNA nodes, and actually is not truly necessary since all that is needed is that the nodes on the link inform each other of their identities and respective availability for CP—CP communication. The XID exchange just described is also instigated when a node is newly installed since each link to which it attaches must then be activated causing the just mentioned sequence to occur automatically on each link.

Continuing discussion of FIG. 6, the nodes evaluate the information obtained in the XID exchange and if one or both nodes is/are unavailable for a CP—CP session or neither provide any services (both are ENs) (see 128), they continue with pre-existent type operations not presently relevant. However, if other are available and at least one provides services (is an NN) (see 129), they continue with further link level exchanges 130. In these exchanges, acting asynchronously to each other the nodes symmetrically instigate communication operations to establish a pair of sessions and in first message exchanges on these sessions to determine respective node capabilities as described below. Thus, in one sequence of exchanges 131-134 initiated by node A, a session binding signal is sent to node B, confirmation is returned from B to A establishing a session, a request for capability characteristics is sent from A to B on this session (as a first message on the session) and a statement of capability characteristics is returned from B to A as a second message on the session. A similar sequence in the other direction, 135-138, establishes another session and a capability-request exchange on that session informs B of A's capabilities.

An important aspect of the BINDS that are sent (131 and 135) is that they are LU 6.2 BINDs and all facilities available to LU 6.2 are available to these simplex sessions. For example, LU 6.2 BINDs are negotiable; that is, many parameters on the BIND may be changed by the receiver (e.g., the maximum size message that can be sent). Thus, the control points do not need to know characteristics of their partners in order to establish the sessions. One piece of information that a CP would like to have is assurance that is partner is whom it claims to be. Again, LU 6.2 provides this service to the control point. LU 6.2 security (described more fully in SC30-3269 above) allows control points to verify the identity of the node with which it is establishing a CP—CP session. At this point, internal operations at the nodes establish conditions limiting use of the two sessions as simplex with oppositely directed flows.

Figure 8:
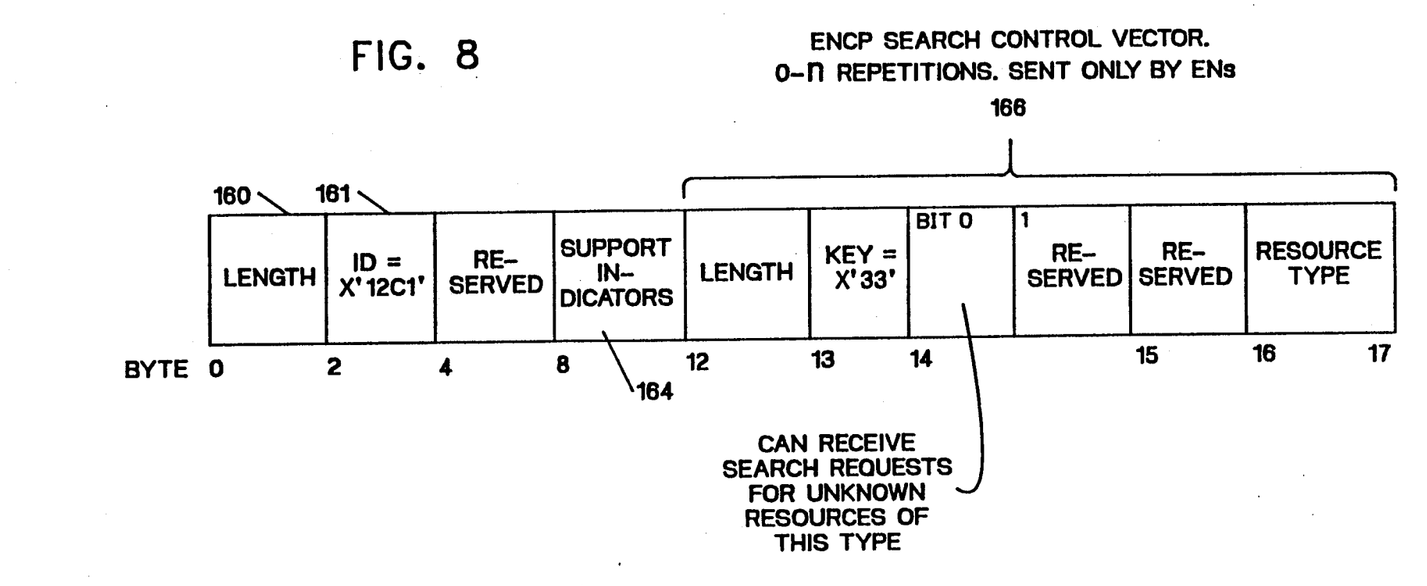
FIG. 8 indicates of the CP-CAPABILITIES (CPCAP) message format.

The capability statement presently contemplated (FIG. 8) contains:

1. A two byte field 160 indicating statement length
2. A two byte field 161 identifying it as a capability statement
3. A four byte field 164 containing a number of "support indicators" (bits which are set to 1 if the sender supports functions associated with respective bit positions and 0 otherwise). These include: a bit indicating if RECEIVE—NETWORK—SEARCH (a search request function associated with a locate operation described in the above co-pending Baratz et al patent application) is supported, a bit indicating if directory services are provided by the sender relative to resources in other domains (which means that the sender will propagate search requests as required; a bit indicating if TOPOLOGY—UPDATE—DATA-BASE service is provided (i.e. if sender supports receipt of certain topology database information updates on this session); bits indicating if sender provides certain management service data on request and supports receipt of unsolicited management data at sender's node; and additional reserve bits for other service indications.
4. A variable length field 166 sent only by ENs indicates limits of search services performable by the sender; e.g. to specify particular classes of resources which are searchable. Only ENs send this. NNs accept all searches without restriction.

Other Information Transferred in CP—CP Sessions

Other network state information is exchanged as needed by individual TPs in the CP—CP session. Since a session may involve an arbitrary number of signal transfers of various lengths, the kinds and amounts of state information which may be communicated in this manner is virtually limitless. Examples of information presently contemplated for transfer in this mode are indicated below.

Figure 9:
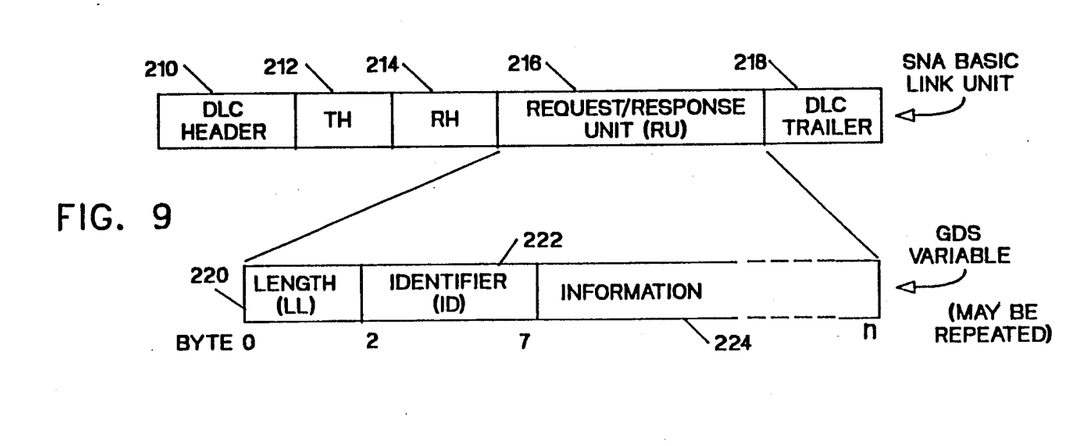
FIG. 9 indicates format of CP—CP session messages.

CP—CP session message formats are indicated in FIG. 9. Referring to FIG. 9, a CP—CP message frame contains a link header 210, a transmission header 212, a response/request header 214, a unit of response/request information 216 and a link trailer 218.

Link headers and trailers in general contain flag information indicating respective beginning and end points of a message. The link header also contains address information indicating the message destination and link control information. The trailer also contains information that the receiver uses to check the received frame for errors that may have been introduced by the communication channel. Link header and trailer portions in a CP—CP message frame have the same form as respective portions of other T2.1 message frames.

The transmission header for any session contains a format identification field (FID) indicating one of five types depending on the types of nodes sending and receiving. The length of this header depends on its type. Transmissions between T2.1 nodes use FID type 2 having a 6 byte length, and also containing session identification information. A CP—CP session is distinguished by a particular session identification value.

The request/response header contains a bit distinguishing the associated request/response unit as either a request or a response, and other fields relating to the respective unit. Such other fields indicate if the respective information unit is part of a larger chain of units being sent in separate message frames, and if so the relative position of this unit in the chain (beginning, end or middle).

Figure 10:
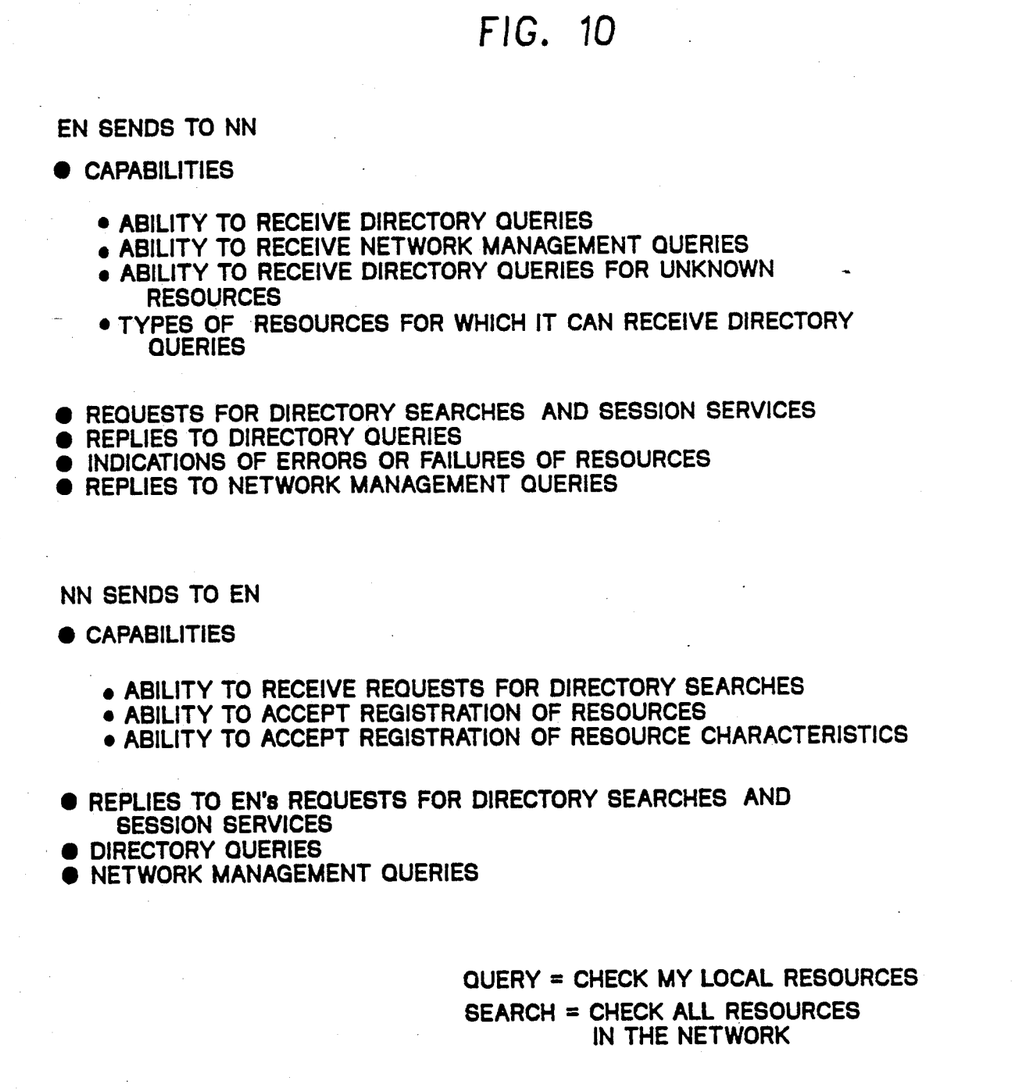
FIG. 10 indicates information which may be transferred between APPN-EN and APPN-NN nodes in CP—CP sessions.
Figure 11:
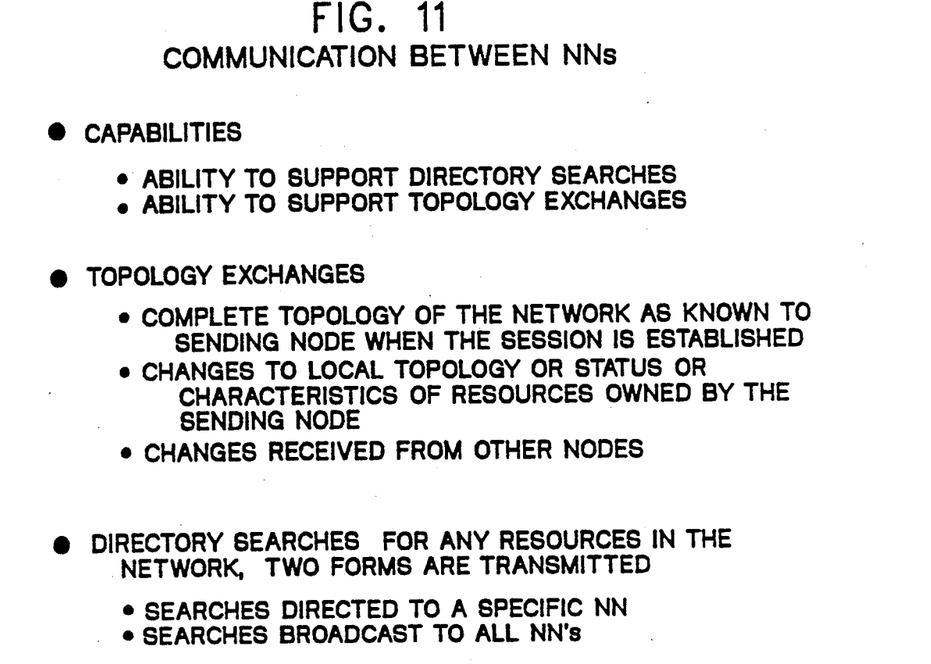
FIG. 11 indicates information which may be transferred between APPN—NN nodes in CP—CP sessions.

Examples of types of information exchanged in CP—CP sessions are listed in FIGS. 10 and 11; FIG. 10 relative to exchanges between NN and EN pairs, and FIG. 11 relative to exchanges between NN pairs. These include the capability exchanges discussed above, and exchanges of other network state information within limits defined in the capability exchanges.

Between an NN and EN, the capability exchange may indicate the ability of the EN to receive and handle various types of queries (e.g., directory or network management), and the ability of the NN to respond to requests for directory and requests to register resources and/or their characteristics. Other network state information between such nodes may include: EN requests for directory searches, NN replies to such requests, NN directory queries, EN replies to such, NN network management queries, EN replies to same, etc.

Capability exchanges between paired NNs may indicate respective node abilities to support directory searches and exchanges of network topology information. Other network state information exchanges may permit such nodes to conduct directory searches relative to directories at one or more other nodes, either on a point to point basis or in a broadcast mode, and to access topology information at another node.

5. Session Outage Detection

Conditions creating unscheduled terminations of CP—CP sessions (link failures, modem failures, etc.) are monitored by internal node processes transparent to the activities in such sessions. The techniques used may be different for different links. Examples of such techniques are listed in FIG. 12. Actions taken when such condition is detected are discussed below under "Notification of Transaction Programs..".

Figure 12:
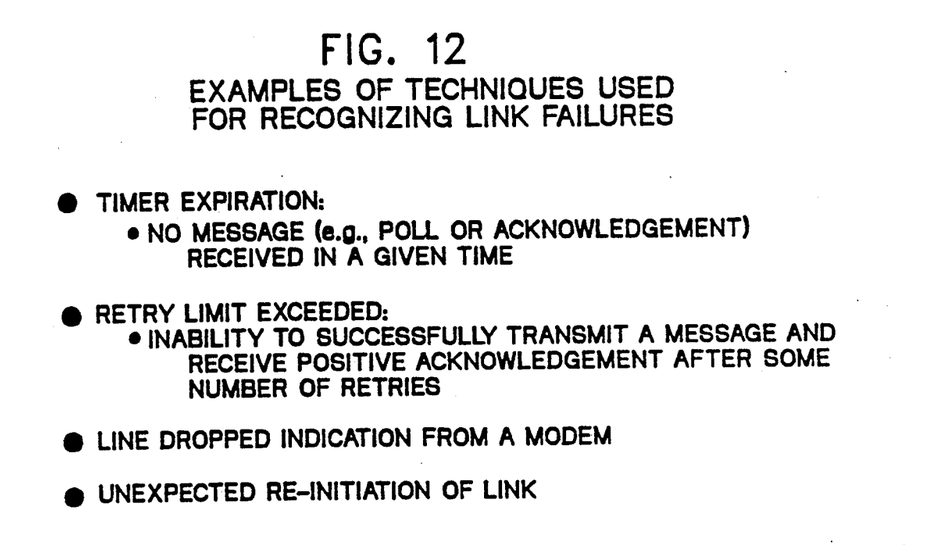
FIG. 12 indicates how various different link types may be monitored for detection of error conditions representing CP—CP session outages.

Relative to appropriate link media, the node CP may initiate a timeout after any acknowledgeable message is sent, and if no acknowledgement is received before the timeout limit an error indication may be set. The system should allow for a reasonable number of retries if negative acknowledgements are received during the retry period (suggesting transient disturbances) before setting the error condition. On modem links to a switched network (e.g. the public telephone system), detection of a line dropped ("no carrier") condition may invoke the setting of the error condition. An unexpected reactivation of a link believed to be already in use may lead to invocation of the error condition.

Notification Of Transaction Programs On Outage Detection

Figure 13:
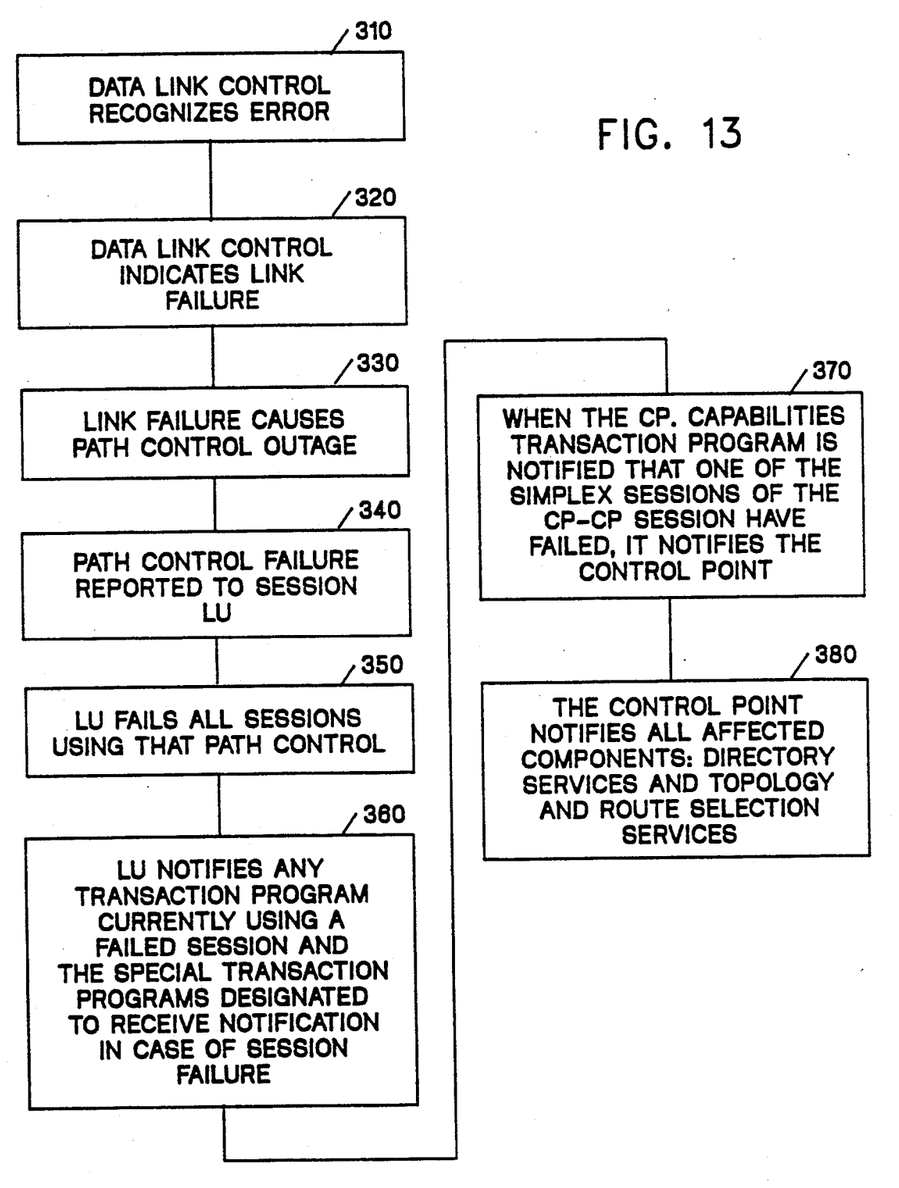
FIG. 13 indicates how detected error conditions are handled relative to transaction programs affected by CP—CP session outages.

FIG. 13 indicates actions which occur at a node when an error condition is set. The data link control element recognizes a link failure (310). That element sets a link failure indication (320) and notifies a path control element. The path control element posts a path control outage indication relative to the related paths (330) and notifies all LUs including the LU that supports the CP—CP session (the session LU) (340). The session LU sets failure indications relative to all sessions using the affected path (350) and notifies all TPs using any failed session as well as any TPs designated to receive notification of specific session failures (360). For the CP—CP session, the last mentioned special TP is the TP for communicating local capabilities to other nodes and it notifies the node CP that one of the simplex sessions have failed (370). The CP thereupon notifies all affected components at the node and use of the session is thereby terminated.

Transaction Program Use of CP—CP Sessions and LU 6.2 Components.

Figures 14, 14A:
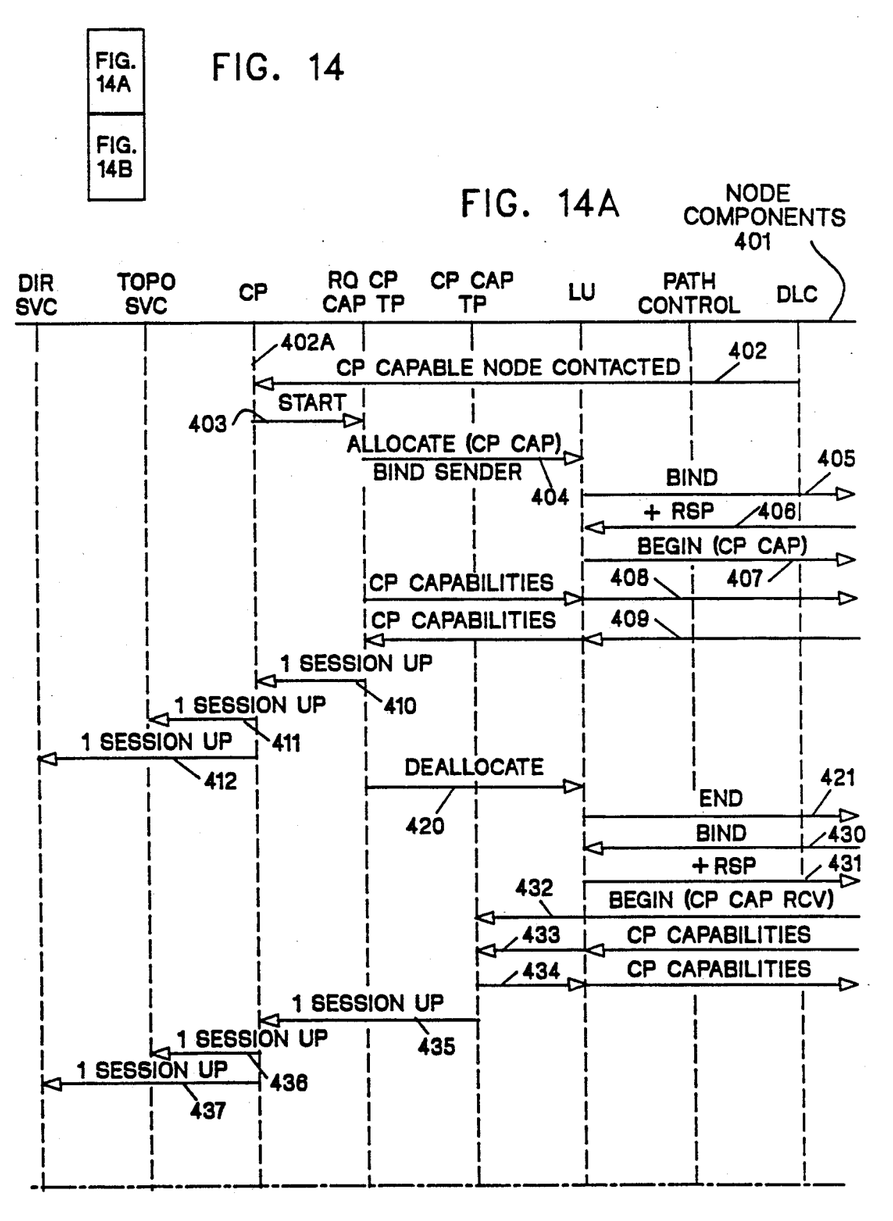
FIG. 14 shows the proper orientation of FIGS. 14A and 14B.
FIGS. 14A and 14B, taken together illustrate how TPs and LUs interact to use and control CP—CP sessions.
Figure 14B:
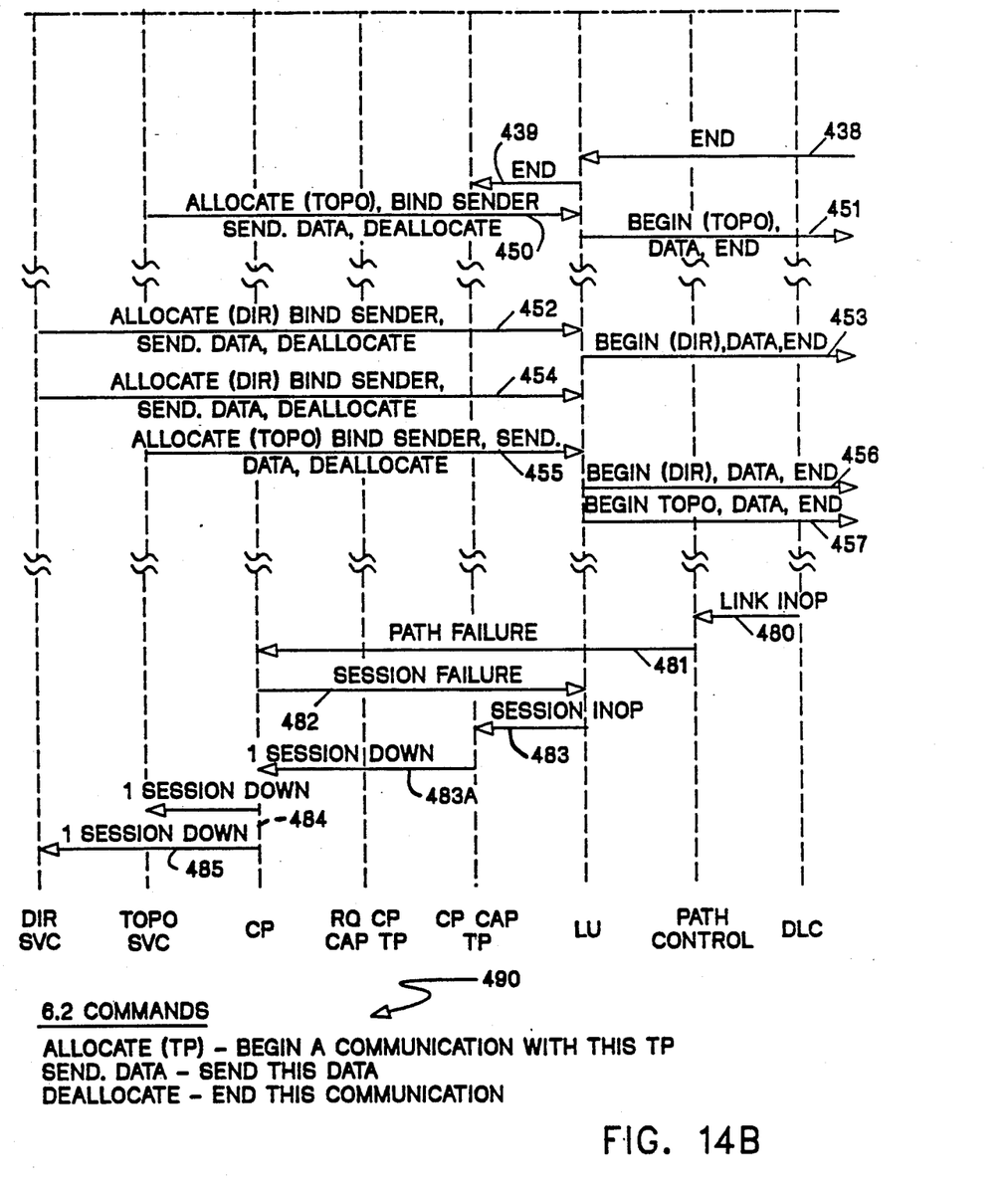

FIGS. 14A and 17B, arranged one above the other as shown in FIG. 14, indicate the progression and relation of node activities associated with activation, use and deactivation of CP—CP sessions. Line 401 at the top of FIG. 14A indicates the various node components participating in these activities. The component associated with each action is indicated by the vertical dotted line which meets the left end point of the respective action line and the point of intersection of the same vertical line with line 401. Thus, for example vertical dotted line 402A indicates that action 402 is performed by the node CP.

Actions relating to activation use and unexpected termination of a CP—CP session are indicated in the order of their occurrence from top to bottom in FIG. 14A and then continuing from top to bottom in FIG. 14B. Actions relating to activation of the session and associated capability exchanges are indicated by lines 402 to 412, 420, 421 and 430 to 439.

At 402, the node CP determines that a remote node supporting a CP—CP session has been contacted, and indicates this occurrence (403) to the TP responsible for initiating the CP CAPABILITIES exchange at this node. That TP requests the node LU to send a session BIND signal (404) to the remote node and prepare the latter node for receiving a capabilities message on that session. It should be noted that action 402 implies a prior exchange of XID3 signals between the nodes indicating that both nodes support CP—CP sessions and are currently able to have such a session on the link through which contact was established.

After action 404, the LU sends a BIND (line 405) which if properly received evokes a positive response from the other node (line 406). Based on the LU to which the BIND is directed and the mode that is requested for the session, the LU identifies the CP-CAPABILITIES TP (CP CAP TP in the figure) as the TP that should be notified if the session fails. There is a single instance of the CP-CAPABILITIES TP running in the node and all requests for conversations and session outage notifications are placed in a single queue in order to maintain the proper sequence. A single transaction program (e.g., CP-CAPABILITIES) is able to participate in multiple conversations at once, so this single TP can participate in a capabilities exchange with multiple different partners at once. On getting that response the LU forwards a message frame preparing the remote node for reception of a capability message (line 407) and then interacts with the REQUEST-CP-CAPABILITIES TP (RQ CP CAP TP in the figure)—the TP responsible for requesting the remote node's capabilities—to send the capability message via the LU (line 408). When a response from the remote node returns the capability message (again via the LU) (line 409), that TP notifies the CP that a simplex session is active (line 410). The CP then notifies node components responsible for managing topology and directory services that a session is active (lines 411 and 412).

The REQUEST-CP-CAPABILITIES TP then deallocates the conversation, making the session available to other components, and notifies the LU of this (line 420), whereupon the LU sends an END message to the remote node (line 421) indicating completion of capability exchange on this session.

In parallel with the function described by 402 to 412, the remote node was performing the same actions for establishing a paired session and forwarding its capability (actions 430 to 439). These actions are shown sequentially only for the purpose of presentation.

The remote node begins with a BIND signal to the local node (line 430) which the local LU acknowledges with a response (line 431). Outages on this session are also reported to the CP-CAPABILITIES TP. The remote node follows with a message indicating that a capability request will follow (line 432), and the local LU passes that to the local TP responsible for exchanging node CP session capability (CP-CAPABILITIES TP). The remote node follows with its capability statement that is relayed by the local LU to the CP-CAPABILITIES TP (line 433), whereupon that TP returns a suitable response message (again, via the LU) (line 434) and also notifies the local CP that a simplex session in the reverse direction is up (line 435). The CP then notifies the components managing topology and directory services that a session is up (lines 436 and 437). Meanwhile, the remote node sends its END signal indicating completion of the capability transfer conversation (line 438), and a related indication is passes from the local LU to the local CP-CAPABILITIES TP (line 439).

Now the nodes begin using the two sessions, in simplex modes, to transfer other network state information as needed between TPs requiring it. Examples of local to remote transfers in this mode are given on lines 450 to 457. In one such exemplary transfer, the local topology service facility signals the local LU that it wants to allocate the CP—CP session for a topology data transfer (line 450). Topology services passes its indication to begin a conversation, the data to transfer, and the indication to end the conversation without concern for whether the conversation is without concern for whether the conversation is immediately allocated. Since the session is currently unused, it is allocated for the topology transfer and a corresponding begin message is sent to the remote node. Then, the data is passed to the remote node and the LU passes an END signal to the remote node (line 451). If the data is small enough, the begin, data and ending indication can all flow in a single message. If there is too much data, there will be multiple messages. Similar sequences are suggested at lines 452 and 453 to pass directory data to the remote. Then a set of queued transfer is suggested on lines 454–457; wherein the transactions associated with session allocation and directory data transmittal are queued relative to the LU at 454, and similar actions occur to place topology message activity in the queue as shown at 455, and then the LU acts to transfer appropriate signals to the remote node to effect transfer of first and queued directory data (line 456) and then the queued topology data (line 457).

Finally, an example of session outage due to unanticipated conditions is indicated in lines 480–485. Path control facilities learn of path failure as previously described with respect to FIG. 13 (and suggested briefly at 480), and notify the local CP (line 481). The CP notifies the LU of all session failures (line 482), and the latter posts a corresponding indication to the CP-CAPABILITIES TP (line 483). That TP then notifies the CP that one of the simplex sessions has failed and the (line 483*a*) notifies the components managing directory and topology services (lines 484 and 485) and use of the session is discontinued.

We claim:

1. A method of disseminating network state information (NSI) in a computer network containing nodes of a predetermined type, each of said nodes being capable of sustaining NSI exchange sessions only with other nodes of like type, said method being practiced at each of two nodes at opposite ends of a link and comprising the steps of:

sending a first set of signals to the other node upon activation of the link, said first set of signals indicating the availability of the sending node to participate in an NSI exchange session;

processing signals received from the other node to determine if both nodes are available for participation in an NSI exchange session and whether the other node is a service provider;

sending a second set of NSI exchange session-establishing signals to the other node if both nodes are available for an NSI exchange session and at least one of the nodes is a service provider;

sending a third set of signals to the other node on the established session to provide the other node with information as to the capabilities of the sending node; and making said NSI exchange session available to transaction programs running at the node.

2. A method as defined in claim 1 wherein each of the nodes at opposite ends of the link independently establishes a session flowing from the node to the other node.

3. A method as defined in claim 2 wherein a node receiving information from the other node need not directly acknowledge the receipt of that information.

4. A method of disseminating network state information (NSI) in an SNA computer network containing Type 2.1 nodes, each of said nodes being capable of sustaining NSI exchange sessions, referred to hereafter as CP—CP sessions, only with other Type 2.1 nodes, said method being practiced at each of two nodes at opposite ends of a link and comprising the steps of:

sending a first set of signals to the other node upon activation of the link, said first set of signals indicating the availability of the sending node to participate in a CP—CP session;

processing signals received from the other node to determine if both nodes are available for participation in a CP—CP session and whether the other node is a service provider;

sending a second set of CP—CP session-establishing signals to the other node if both nodes are available for such a session and at least one of the nodes is a service provider;

sending a third set of signals to the other node on the established CP—CP session to provide the other node with information relating to the capabilities of the sending node; and making said CP—CP session available to transaction programs running at the node.

5. A method as defined in claim 4 wherein the third set of signals identifies the sending node either as an end node incapable of providing routing services to other nodes or a network node capable of providing such services.

* * * * *